United States Patent [19]
Schubring et al.

[11] Patent Number: 5,938,279
[45] Date of Patent: Aug. 17, 1999

[54] DYNAMIC VEHICLE HEAD RESTRAINT ASSEMBLY

[75] Inventors: James Douglas Schubring, Swartz Creek; James Bolsworth; Todd Hughes Smith, both of Sterling Heights; Radu Gabriel Munteanu, Warren, all of Mich.

[73] Assignee: Lear Corporation, Southfield, Mich.

[21] Appl. No.: 09/070,992

[22] Filed: May 1, 1998

[51] Int. Cl.⁶ ........................................ B60N 2/42
[52] U.S. Cl. ...................... 297/216.12; 297/408; 297/410
[58] Field of Search ................... 297/410, 408, 297/216.12

[56] References Cited

U.S. PATENT DOCUMENTS 5,378,043  1/1995  Viano et al. .

Primary Examiner—Peter M. Cuomo
Assistant Examiner—David E. Allred
Attorney, Agent, or Firm—Brooks & Kushman PC

[57] ABSTRACT

A dynamic head restraint mount (18) includes an low swinging impact plate (22) which swings back below a seat back frame top tube (10) in response to a sudden vehicle deceleration. As it swings back, the plate (22) causes the upper ends of a pair of upstanding head restraint support post guide tubes (24) to rock forwardly of the top tube (10), tilting the head restraint 14 forward. Concurrently, a linkage activated by the same impact plate (22) motion independently causes the support posts (12) of the head restraint (14) to slide up to a consistent highest position above the top tube (10), regardless of the adjusted position within the guide tubes (24) from which the support posts (12) began.

3 Claims, 6 Drawing Sheets

DYNAMIC VEHICLE HEAD RESTRAINT ASSEMBLY

TECHNICAL FIELD

This invention relates to a dynamically responsive vehicle head restraint assembly that raises the head restraint to a consistent uppermost adjusted position.

BACKGROUND OF THE INVENTION

Vehicle head restraints typically include an upper cushion and a pair of parallel support posts that are inserted down into a guide member within the top of the seat back frame, and moved up or down to a desired adjusted height above the top of the seat back. While powered height adjustment systems exist, the much more common system is manual, in which the cushion is simply pulled or pushed up or down by the seat occupant. The support posts are generally held in place by a friction mechanism at any position between a lowest and highest limit position, or at any one of series of discrete positions.

Until relatively recently, a head restraint was static, apart from the up and down height adjusting motion. A recent coassigned U.S. Pat. No. 5,378,043, disclosed a dynamic design that moved the head restraint forward and up in response to a sudden vehicle acceleration, such as that caused by a rear impact. The head restraint support posts slide within a support, and a target structure plate is pivoted to the horizontal top bar of the seat back frame so as to be able to swing backwardly. This backward swinging motion occurs in response to the backward force of a relatively decelerating seat occupant into the seat back. The backward swinging of the impact target below the seat back frame top bar is matched by a forward swinging of the head restraint cushion and its guide posts above the top bar. More than a simple, rocking forward is involved, however. The guide tubes within which the support posts adjustably slide are designed to slide upwardly relative to the top bar, due to a camming action, which raises the head restraint cushion relative to the top bar. However, how far above the seat back frame top bar the head restraint cushion ultimately raises depends on how far upwardly the head rest cushion and its support posts were originally located. The head restraint does not achieve a consistent final raised position above the seat back frame top bar.

SUMMARY OF THE INVENTION

More specifically, in the preferred embodiment disclosed a vehicle seat has a seat back frame with a generally horizontal top bar. A head restraint has an upper cushion and a pair parallel support posts that slide adjustably up and down in front of the seat back frame top bar, moving the head restraint cushion up or down relative to the top bar between lowest and highest limit positions. The invention assures that, in terms of its dynamic response, the cushion finishes consistently at, and only at, the uppermost adjusted position, regardless of its starting point.

To achieve the consistent response, the head restraint is mounted to a combined impact plate and head restraint mount that decouples the forward rocking motion from the concurrent upward sliding motion. The impact plate swings substantially horizontally beneath the top bar, about a pivot axis located just beneath the top bar, in response to occupant induced backward force. A pair of vertically upstanding support post guide tubes rock forwardly of the frame top bar, along with the head restraint, concurrently with the backward swinging of the impact plate. The head rest slides upwardly independently, through a special linkage that is activated by the same basic swinging motion.

The linkage is anchored to a pair of fixed brackets, rigid to the seat back frame and located to either side of the impact plate, clear of its swinging motion. A double swing mechanism, preferably one for each bracket, each has a primary lower link and a secondary upper link, each pivoted at an inner end to a fixed bracket. The outer end of the primary link is moved upwardly indirectly by the impact plate, through a bell crank that translates the basic horizontal swinging motion into upward swinging motion of the primary link. The primary link, in turn, pushes the secondary link up in an amplified manner, through a transfer link that is pivoted, preferably, to the secondary link at a point close to its inner end. The secondary link outer end, therefore, swings through a wider arc than the primary link. The outer end of the secondary link has a pulling link that depends therefrom, and the lower end of the pulling link is pivoted to a slider block that slides upwardly through a guide tube.

As the impact plate swings back, the amplified upward swinging of the secondary links concurrently pull the slider blocks up and through the head restraint support posts' guide tubes. If the support posts are all the way down, they are immediately contacted and pushed up to the highest possible raised position. If the support posts are part way up, they are engaged later, and moved only to the same consistent raised position. If the support posts are already at the upper limit position, they are not moved up any farther. A consistent raised position is thereby achieved.

BRIEF DESCRIPTION OF THE DRAWINGS

These and other features of the invention will appear from the following written description, and from the drawings, in which.

DESCRIPTION OF THE PREFERRED EMBODIMENT

Figure 1:
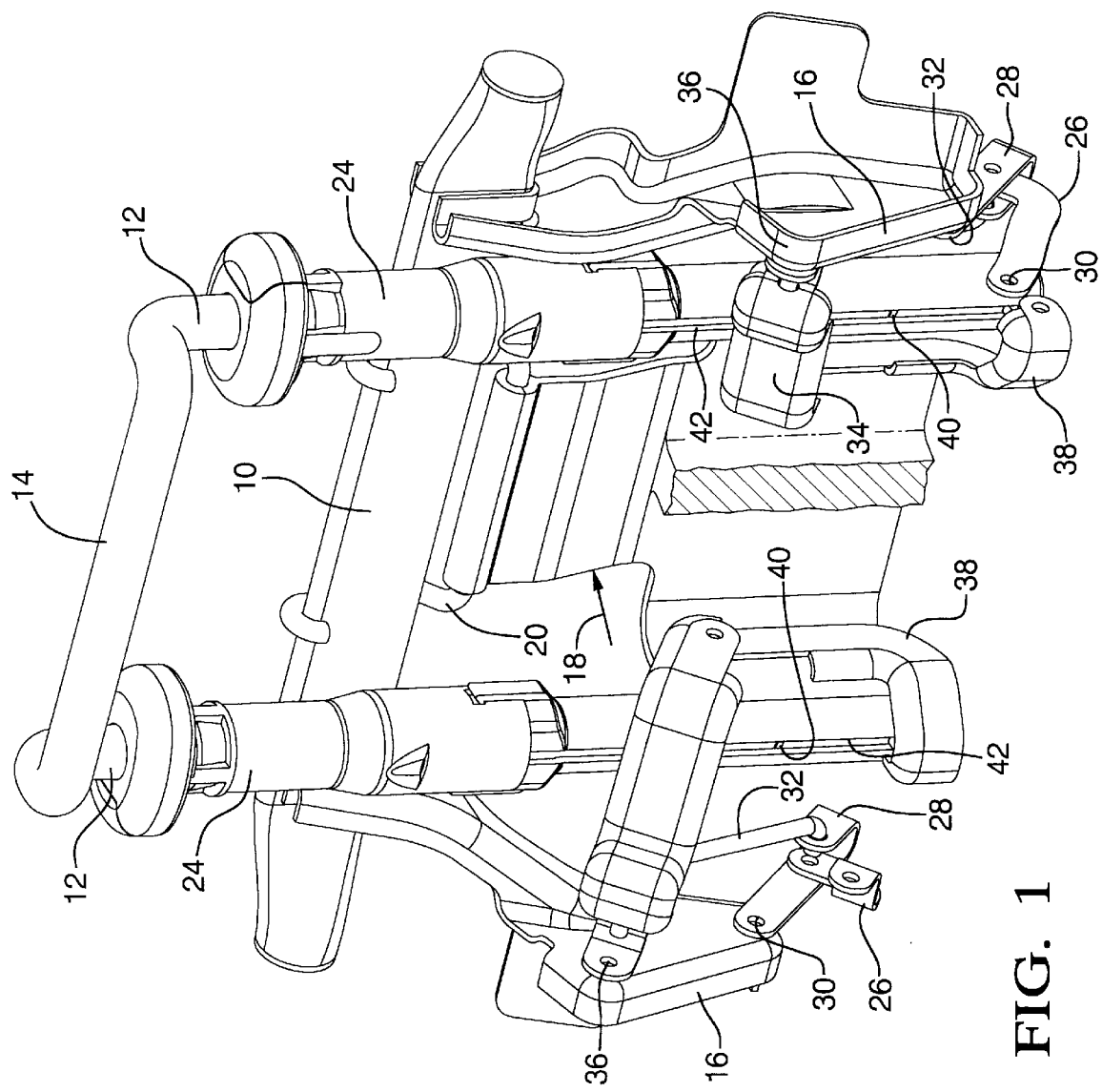
FIG. 1 is a perspective view of the top bar of a seat back frame incorporating a preferred embodiment of the invention in its static condition, with the impact plate broken away to reveal the linkage, and shown with the head-restraint in the lowermost position.

Referring first to FIG. 1, a vehicle said back frame has a rigid, generally horizontal top bar 10, which would typically be supported by a pair of side members, not illustrated. Top bar 10 represents both a structural framework to which other components are attached, and a static reference frame, relative to which they move. A head rest frame is generally U shaped, with a pair of depending, parallel support posts 12 and a cushion support 14, to which a non illustrated cushion would be fixed. Depending from top bar 10 is a bracket, preferably a pair of identical, stationary brackets 16, which serve a function detailed below. Head rest cushion support 14, and its cushion, can be moved up and down "statically" relative to the top bar 10, that is, moved on a one time basis, after which the elevation does not change, in the absence of dynamic forces. The adjustment is done manually, by a seat occupant, simply by pulling up and down on the cushion support 14 to slide the posts 12 up and down. The lowermost limit position is shown. The invention allows the head rest to also move dynamically, in response to a sudden vehicle acceleration and the effect thereon of a seat occupant. In so moving, the support posts 12 rock forwardly of the top bar 10, from their illustrated, slightly rear of vertical position, to a forward of vertical position. Concurrently, the cushion support 14 and cushion raise up relative to the top bar 10, but only to the uppermost limit position, and only if that upper limit position had not been already attained.

Figures 2, 3:
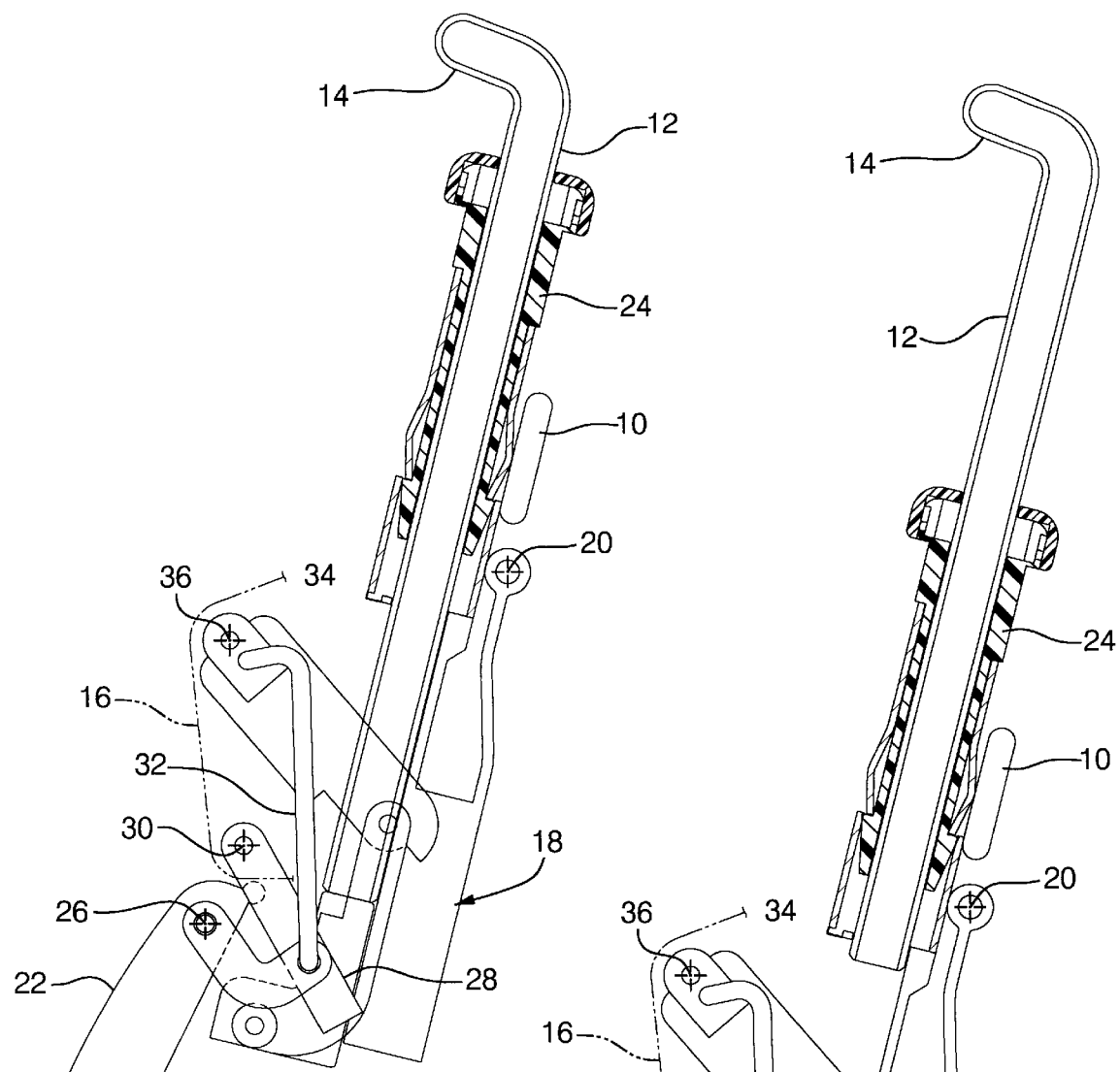
FIG. 2 is a side view of the invention in the same condition as FIG. 1, but showing the impact plate.
FIG. 3 is a side view of the invention, still in the static condition, but with the head restraint raised about mid way.

Referring next to FIGS. 1 and 2, the basic structural framework of the invention combined impact plate and head restraint mount, indicated generally at 18, which is preferably integrally molded of rigid plastic or the like, and located generally below top bar 10 and between the brackets 16. More specifically, the combined mount 18 pivots on a hanger 20 clipped beneath top bar 10, able to swing about a main axis that is generally parallel to top bar 10. Different parts of the mount 18 move differently relative to top bar 10. An impact plate 22 (shown removed in FIG. 1, but actually integral to mount 18) is movable generally horizontally below top bar 10, in a shallow arc between the brackets 16, in direct response to the rearward force imposed by a relatively decelerating seat occupant. Concurrently, the upper portions of a pair of generally vertically upstanding, parallel support post guide tubes 24 rock forwardly of top bar 10.

Figure 4:
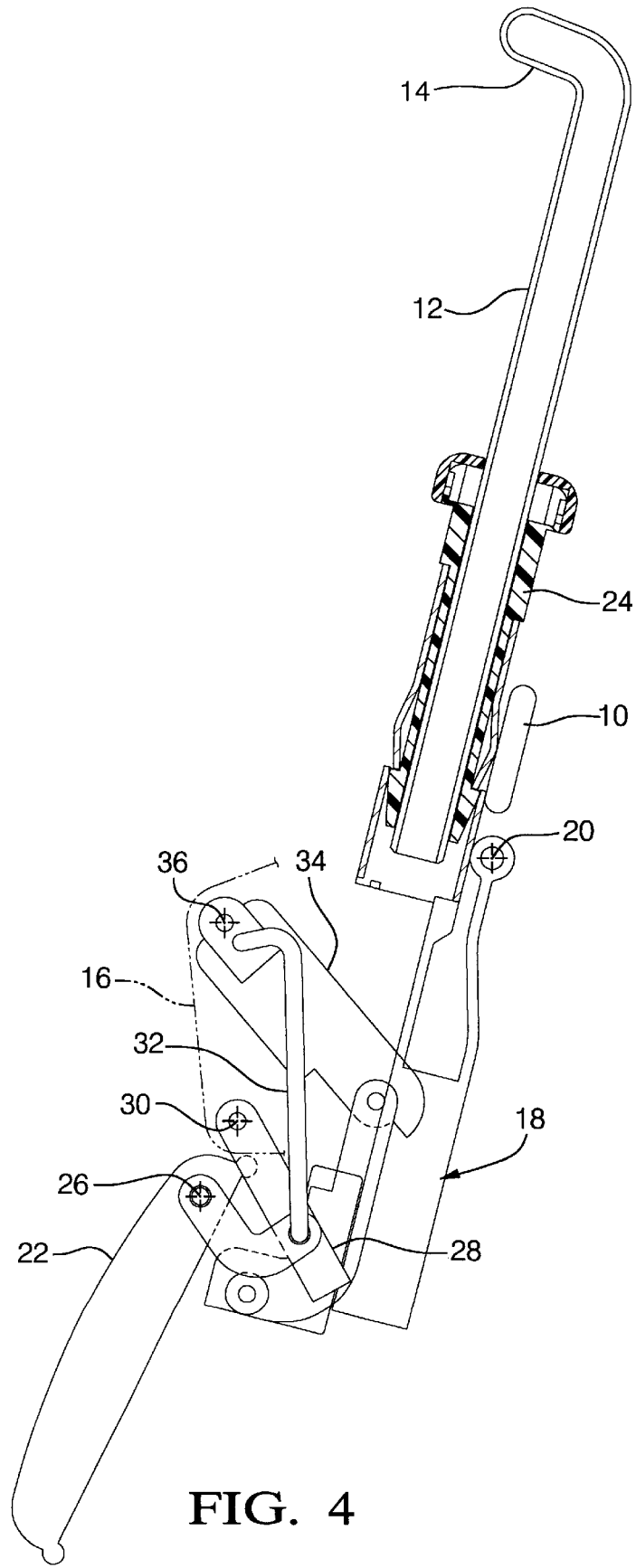
FIG. 4 is a side view of the invention, also in the static condition, with the head restraint raised to the highest point.

Referring next to FIGS. 2, 3 and 4, the manual or "static" height adjustment of the head restraint is illustrated. The support posts 12 are frictionally held within the guide tubes 24 just loosely enough to allow them to be pushed and pulled manually, but they maintain a given adjusted position under normal use. FIG. 2 shows the fully lowered position, FIG. 3 is about half way up, and FIG. 4 is the uppermost limit position. Varying adjustment height creates a varying gap relative to the top bar 10. The invention provides for the head restraint to be raised always to, and only to, the FIG. 4 position, as the mount 18 responds dynamically. A special, independently acting linkage initiates the sliding action of the head rest support posts 12, the elements of which are described next.

Referring again to FIGS. 1 and 2, the initial active member of the linkage is a pair of bell cranks 26, each of which is pivoted at a lower, inner end to the back surface of impact plate 22. The pivots to the plate 22 (which swings in a defined path) represent one constraint on the motion of the bell cranks 26. The other constraint is the pivoting of their upper, outer ends to the outer ends of a pair of primary, lower straight links 28. The inner ends of the primary links 28 are pivoted to the brackets 16 at a lower fixed pivot 30. The outer ends of the primary links 28 are hook shaped, allowing two pivotal connections, one on each side of the hook. One is the pivot connection to the outer end of the bell crank 26 just mentioned. The other is a pivotal connection to the lower end of a rod shaped transfer link 32 that extends upwardly. The upper end of the transfer link 32 is pivoted to an intermediate point of an upper, secondary link 34, closer to the inner end thereof. The inner end of the secondary link, in turn, is pivoted at an upper fixed pivot point 36 to the bracket 16. The outer end of the secondary link 34 is pivoted to the upper end of a depending pulling link 38. The lower end of each pulling link 38 is pivoted to a slider block 40, which sits within the lower end of a guide tube 24, below the lower end of a support post 12. Each slider block 40 can ride up and down, through a clearance slot 42 in a respective guide tube 24. These various links and pivots cooperate as described next.

Figure 5:
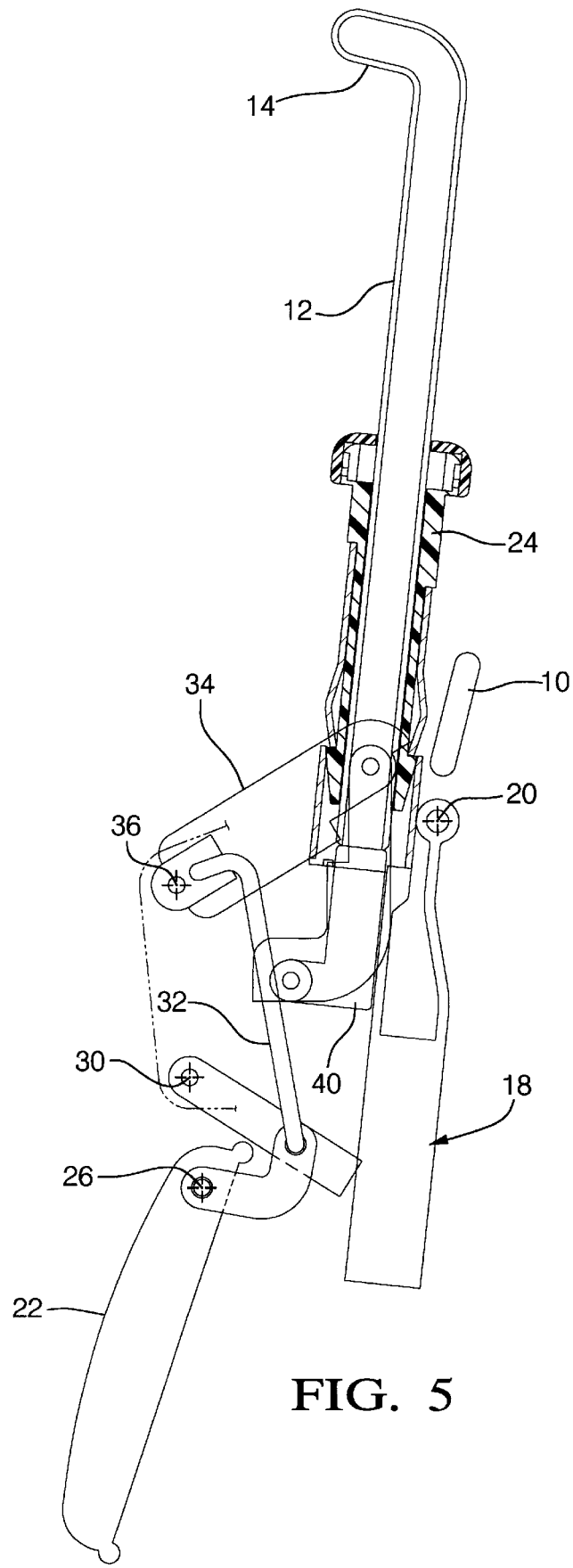
FIG. 5 is a side view of the invention, with the head rest having started from the FIG. 2 position, but having been raised about mid way by the dynamic action of the impact plate and linkage.

Referring next to FIGS. 2 and 5, the impact plate 22, in response to the rearward force of a relatively decelerating seat occupant, swings back about the main pivot axis of hanger 20, over a relatively small total angle of around sixteen degrees as disclosed. In FIG. 5, the impact plate has only traveled midway over the total angle of swing. The upper ends of the guide tubes 24, being part of the same integral piece, rock forwardly over a comparable angle away from the top bar 10. Despite the relatively small swing angle of plate 22, the lever arm of the impact plate 22 relative to the axis of hanger 20 is large enough that the moment is more than sufficient to activate the linkage. As the impact plate 22 swings back beneath the top bar 10, the inner ends of the bell cranks 26 also swing back about the main axis of hanger 20, along with the plate 22. Concurrently, the outer ends of the bell cranks 26, constrained by the primary link 28, swing upwardly, causing the primary links 28 to swing up about lower fixed pivots 30, over a total angle of approximately thirty eight degrees. (Again, primary link 28 is only in a mid travel position in FIG. 5.) As the primary link 28 is swung up, its transfer link 32 is pushed upwardly, which swings the secondary link 34 up about the upper fixed pivot 36. Because the point at which the upper end of each transfer link 32 is pivoted to each secondary link 34 is so close to the upper fixed pivot point 36, the arc through which the secondary links 34 swing is substantially amplified, about one hundred and fourteen degrees total, as compared to the primary link 28 total angle of only about thirty eight degrees. (Again, as with the other links, secondary link 34 is in a mid travel position only in FIG. 5.) As the outer end of each secondary link 34 swings widely upward, the depending pulling links 38 pull the slider blocks 40 upwardly and through the clearance slots 42 in the guide tubes 24. The pivot connection between the lower ends of the pulling links 38 and the slider blocks 40 prevents binding. Since the head restraint support posts 12 were, in FIG. 2, pushed all the way down within the guide tubes 24, and resting near the slider blocks 40, the upward sliding of the slider blocks 40 within the guide tubes 24 has acted from the start to push the support posts 12 up, one to one.

Figure 6:
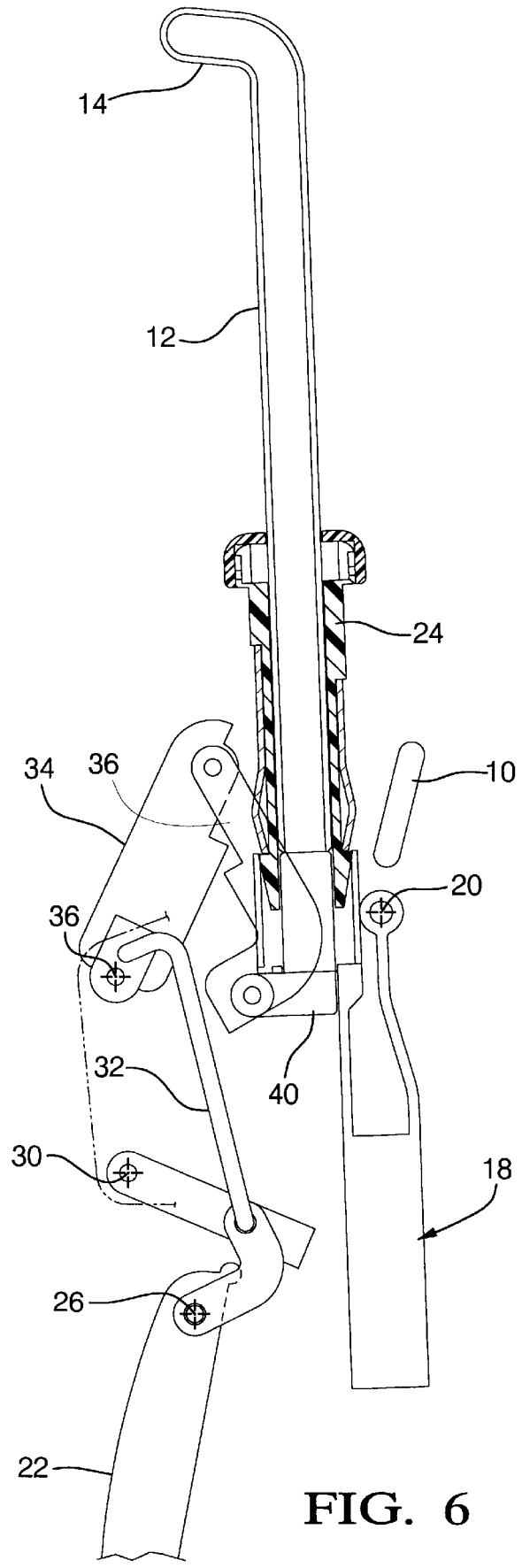
FIG. 6 is a side view of the invention with the head rest having been pushed all the way up by the linkage.

Referring next to FIG. 6, the impact plate 22 has swung back over the total angle described above, as have the links 28 and 34. The top of the guide tubes 24 (and the support posts 12 contained therein) have rocked forwardly relative to the top bar 10, from their original position behind vertical to a new position that is substantially vertical, a total angle of travel equal to the total swing of the plate 22. The pulling links 38 have tipped out and away from the guide tubes 24, pivoting relative to the slider blocks 40. The slider blocks 40 have been pulled all the way up within the guide tubes 24, shifting the support posts 12 the rest of the way up and raising the cushion support 14 to the highest limit position. In an actual seat, with all cushions and upholstery in place, there would be an inevitable gap between the bottom of the head restraint cushion and the top of the seat back cushion. This gap is consistently held, regardless of the original adjusted position of the support posts 12.

Figure 7:
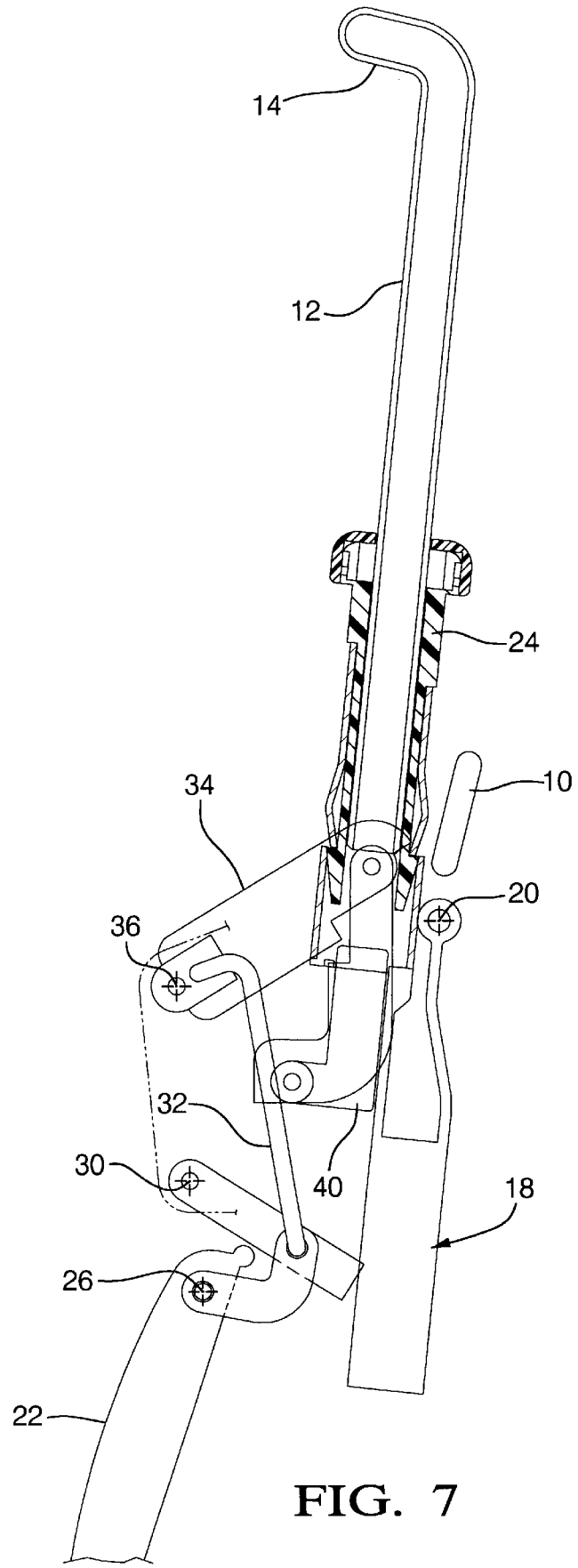
FIG. 7 is a side view of the invention with the head rest having started in the FIG. 4 position, and after the impact plate has moved approximately the same distance as in FIG. 5.

Referring finally to FIGS. 4 and 7, if the impact plate 22 begins to swing back when the posts 12 are already pulled up within the guide tubes 24 to any extent, then there is no initial contact with the slider blocks 40. FIG. 7 shows the situation in which the posts 12 began at the FIG. 4 position, pulled all the way up, and the impact plate 22 has swung mid way. There is still a gap between the bottom of the support posts 12 and the slider blocks 40, and, in fact, contact is not made until the very end of the upward travel of the slider blocks 40. As a consequence, there is no further upward sliding of the support posts 12 within the guide tubes 24 caused by the slider blocks 40. If the support posts 12 begin at an intermediate position, then the slider blocks 40 engage the bottom of the support posts 12 at some point, sooner if the posts 12 are lower, and later if they are higher, but always finish at the same point. The posts 12 are raised consistently to, and only to, the uppermost limit position. In effect, there is complete independence between the rocking forward motion and upward raising motion of the head restraint, although both are activated by the same primary input of the swinging impact plate 22.

Variations in the preferred features of the embodiment disclosed above could be made. Theoretically, a head rest could be supported by a single post, or shifted up by a single linkage, or both, although two identical, parallel support posts is the most common configuration, and two identical linkages are consequently preferred, as well. Depending on the degree to which the head restraint would have to be lifted to reach the upper limit position, the multiplication effect between the angles of the primary link 28 and secondary link 34 could be less, or even none at all, meaning that the upper end of the transfer link 32 could be pivoted to the secondary link 34 at a point less close to the upper fixed pivot 36. However, two links like 28 and 34 would still be needed, that is, a lower and upper link, in order to translate the swinging motion of the low mounted plate 22 (which swings well below the top tube 10) into a swinging and lifting motion located close enough to the top bar 10 to successfully lift the posts 12 upwardly. While the head restraint shown is manually adjusted, simply pulled up or down, it could conceivably be power adjusted. A dynamic disconnect would have to be added between the power mechanism and the head restraint so that the linkage would not have to back drive the power mechanism when it operated. Though not illustrated, a resilient reset mechanism would be desirable, acting between the seat back frame and the impact plate 22 so as to hold the plate 22 in its normal position until overcome by a sufficient impact force, and which would pull it back to the normal position afterward. Such a return spring is shown in the patent referred to above, and could be added to the embodiment disclosed here.

While this invention has been described in terms of some specific embodiments, it will be appreciated that other forms can readily be adapted by one skilled in the art. Accordingly, the scope of this invention is to be considered limited only by the following claims.

We claim:

1. In a vehicle seat having a seat back frame with a generally horizontal top bar (10) and a head restraint (14) having a sliding support post (12), a dynamic head restraint mount responsive to sudden vehicle acceleration so as to rock the head restraint (14) forward while simultaneously raising the head restraint (14) consistently to a highest adjusted position, comprising, a rigid combined impact plate and head restraint mount (18) swingably mounted about a fixed swing axis (20) that is substantially parallel to and suspended from the seat frame top bar (10) and having an impact plate (22) forward of the top bar (10) that swings in a substantially horizontal swinging path beneath the seat frame top bar (10) and a support post guide tube (24) that rocks forwardly of the top bar (10) along with the head restraint (14) as the impact plate (22) swings back beneath the top bar (10), the head restraint support post (12) sliding upwardly within the guide tube (24) as far as the highest adjusted position, a fixed bracket (16) fixed relative to said back frame and located forwardly of and below the seat back frame top bar (10) and clear of the swinging path of the impact plate (22), a swing link mechanism, including a lower, primary link (28) pivoted at an inner end to a lower fixed pivot point (30) on the fixed bracket (16), an upper, secondary link (34) pivoted at an inner end to an upper fixed pivot point (36) on the fixed bracket (16), and a transfer link (32) pivoted at a lower end to an outer end of the primary link (28) and pivoted, at an upper end to the secondary link (34), so that an upward swinging motion of the lower primary link (28) about the lower fixed pivot point (30) is translated by the transfer link (32) into an upward swinging motion of the outer end of the upper secondary link (34), a pulling link (38) depending by an upper end pivot from the outer end of the secondary link (34), a slider block (40) pivoted to a lower end of the pulling link (38) and slidably received upwardly within said guide tubes (24) so as to push the head restraint support post (12) upwardly to the highest position when the head restraint (14) is lower than the highest position, and, a bell crank (26) having an inner end pivoted to the impact plate (22) and an outer end pivoted to the primary link (28), so as to rotate upwardly as the impact plate (22) swings beneath the top bar (10) and thereby swing the primary link (28) upwardly about the lower fixed pivot (30), whereby, as the impact plate (22) swings back about the swing axis (20) beneath the top bar (10) to rock the guide tube (24) and head restraint (14) forwardly, the impact plate (22) and bell crank (26) swing the primary link (28) upwardly, thereby swinging the secondary link (34) upwardly and concurrently pulling the pulling link (38) up and sliding the slider block (40) upwardly within the guide tube (24) to move the head restraint (14) upwardly consistently to the highest adjusted position as the head restraint (14) concurrently rocks forwardly of the top bar (10).

2. A dynamic head restraint mount according to claim 1, further characterized in that the transfer link (32) is pivoted at its upper end to an intermediate point on the secondary link (34), so as to translate the swinging motion of the lower, primary link (28) into a magnified swinging motion of the upper, secondary link (34).

3. A dynamic head restraint mount according to claim 1, further characterized in that, the head restraint (14) has a pair of parallel support posts (12), the mount (18) has a pair of support post guide tubes (24), a pair of identical fixed brackets (16) are located each to a respective side of impact plate (22), and each fixed bracket (16) supports an identical primary link (28) and an identical secondary link (34), from which depends a pulling link (38) and slider block (40) and, the impact plate (22) supports a pair of identical bell cranks (26).

* * * * *